M. W. HEYENGA.
RUNNING GEAR FOR VEHICLES.
APPLICATION FILED APR. 24, 1908.
925,579.
Patented June 22, 1909.
2 SHEETS—SHEET 1.
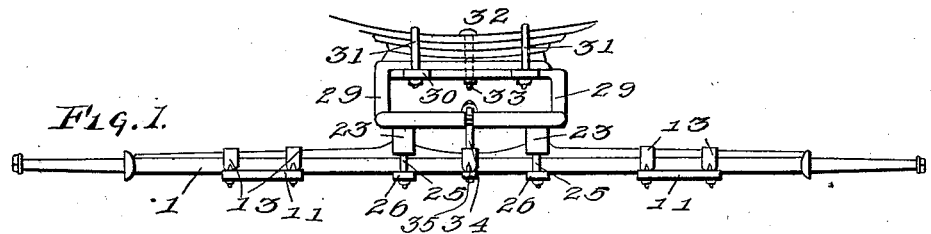
Fig. 1.
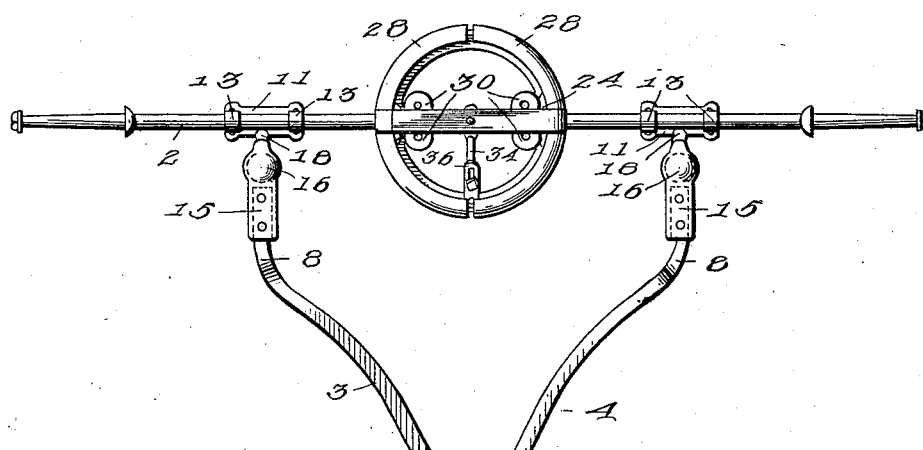
Fig. 2.
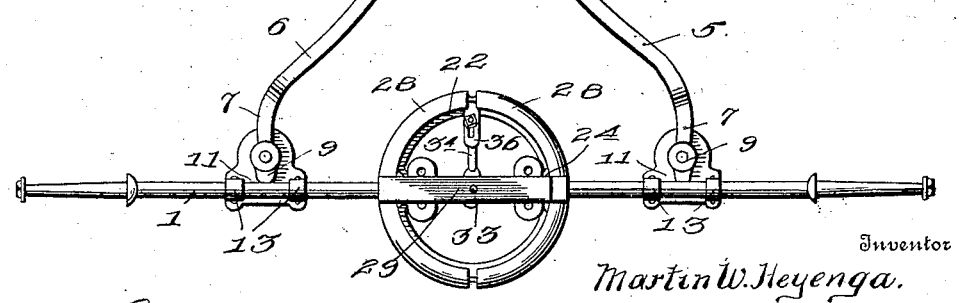
Inventor
Martin W. Heyenga.
Witnesses
By
Attorneys M. W. HEYENGA.
RUNNING GEAR FOR VEHICLES.
APPLICATION FILED APR. 24, 1908.
925,579.
Patented June 22, 1909.
2 SHEETS—SHEET 2.
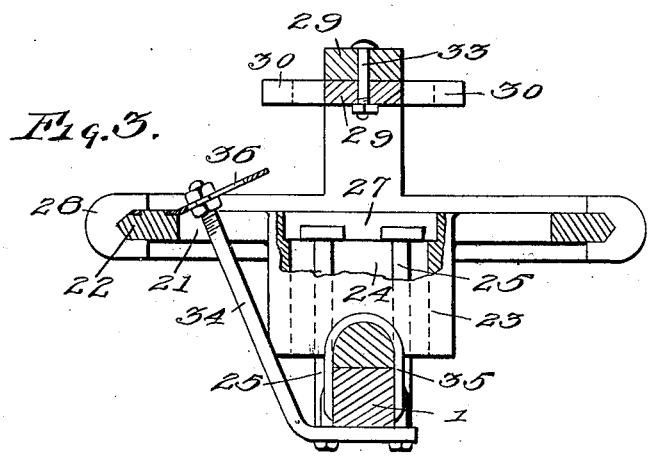
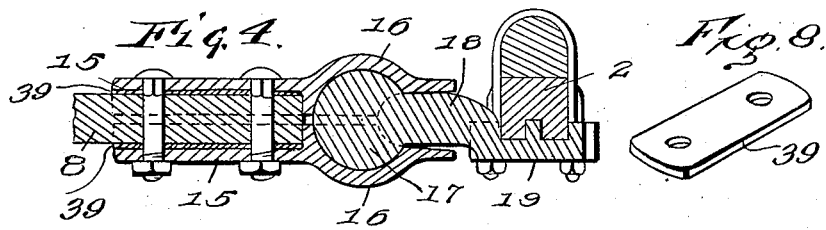
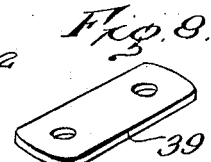
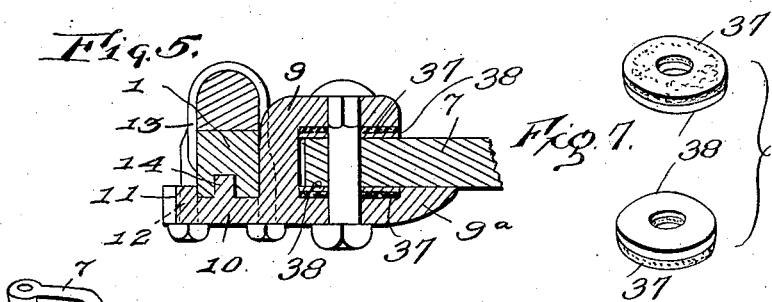
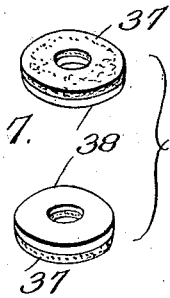
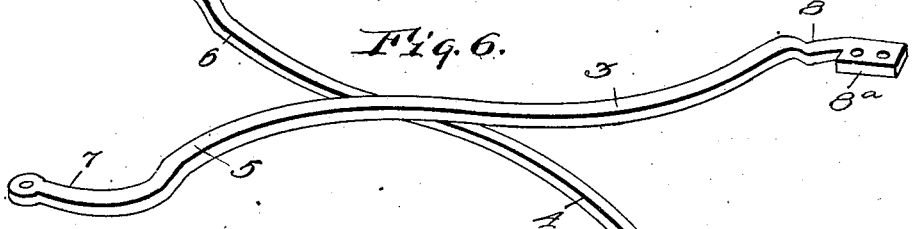
Witnesses
Inventor
Martin W. Heyenga.
By
Attorneys

UNITED STATES PATENT OFFICE.

MARTIN W. HEYENGA, OF CHICAGO, ILLINOIS.

RUNNING-GEAR FOR VEHICLES.

No. 925,579.

Specification of Letters Patent.

Patented June 22, 1909.

Application filed April 24, 1908. Serial No. 429,017.

*To all whom it may concern:*

Be it known that I, MARTIN W. HEYENGA, citizen of the United States, residing at Chicago, in the county of Cook and State of Illinois, have invented certain new and useful Improvements in Running-Gear for Vehicles, of which the following is a specification.

This invention comprehends certain new and useful improvements in vehicle running gear of that type in which the parts are so arranged that the rear axle will turn upon the turning of the front axle, thus enabling the vehicle to be turned about in a restricted place.

The primary object of my invention is an improved running gear of this character, of simple and durable construction, and efficient in its operation, the parts being capable of being easily manufactured and readily assembled and so arranged as to provide against the upsetting of the vehicle in making turns.

With this and other objects in view that will more fully appear as the description proceeds, the invention consists in certain constructions and arrangements of the parts that I shall hereinafter fully describe and then point out the novel features thereof in the appended claim.

For a full understanding of the invention and the merits thereof, and to acquire a knowledge of the details of construction, reference is to be had to the following description and the accompanying drawings, in which:

Figure 1 is a front elevation of a vehicle running gear embodying the improvements of my invention; Fig. 2 is a top plan view thereof; Fig. 3 is a transverse sectional view, on an enlarged scale, the section being taken through the fifth wheel; Fig. 4 is a sectional view illustrating one jointed connection between the reaches and an axle; Fig. 5 is a similar view of another jointed connection; Fig. 6 is a detail perspective view of the crossed reaches. Fig. 7 is a detail view of a set of washers employed between the front ends of the reaches and their coupling irons; Fig. 8 is a similar view of a washer that is employed between the rear ends of the reaches and their irons.

Corresponding and like parts are referred to in the following description and indicated in all the views of the drawings by the same reference characters.

Referring to the drawings, the numeral 1 designates the front axle of a vehicle, 2 the rear axle thereof, and 3 and 4 two obliquely extending reaches arranged to effect the turning of the rear axle upon the turning of the front axle to effect a short turn. The reach 3 extends over the reach 4, and is provided with an upwardly bowed intermediate portion 5, and the other reach 4 is correspondingly provided with a downwardly bowed intermediate portion 6. Both reaches are formed with outwardly deflected ends, as indicated at 7 and 8, so that the main portions of the reaches will be positioned near the middle of the vehicle body so as to be inconspicuous, and so located as to in no wise interfere with the steps secured to the vehicle body. It is to be understood that both of these reaches are preferably rigid throughout their length, so as to prevent any swinging or twisting movement of the rear axle when the vehicle is being drawn along a straight stretch of road.

The forward ends 7 of the respective reaches 3 and 4 are received in horizontally disposed forked members 9 of reach coupling irons 10. Each coupling iron embodies a tie plate 11 which is slightly dished on its upper surface, and which is formed at its ends with slots 12 designed to receive clips 13 that embrace the front axle 1. Each tie block is formed with an upwardly projecting pin 14 accommodated in an opening formed for it in the lower side of the axle so as to securely hold the coupling iron in place after it has once been clipped to the axle. Bolts extend through the fork members and through the forward ends of the reaches to pivotally connect the reaches to the front axle. It is to be particularly noted that the lower fork member of each front coupling iron 9 is extended around or in the rear of the bolts as indicated at 9ª, so as to form a broad bearing surface in engagement with the reach, thereby preventing any forward tipping of the axle.

The rear ends 8 of the reaches are enlarged, as indicated at 8ª, and are received between shanks 15 which are bolted thereto, as shown. These shanks 15 are formed at their rear ends with rounded sockets 16, forming bearings for the heads 17 which are also rounded, as shown, and which are formed on the forward ends of stems 18 of the rear coupling irons 19. These coupling irons 19, so far as their tie plates, pins and clips are concerned, are like the front coupling irons 10 above described. The bearings or sockets 16 for the ball-like heads 17 are formed with rearwardly projecting lips, as shown, so as to limit or prevent any tilting movement of the rear axle. By constructing the connection between the rear axle and the reaches as before described, unnecessary wear and friction on the reaches, clips and bolts are avoided.

In the present invention, it is preferred that both front and rear axles be provided with fifth wheels. As they are each substantially alike, a description of one will suffice. The fifth wheel 21 embodies an annular plate 22 constituting the relatively movable member of the fifth wheel, said plate being formed at substantially diametrically opposite points with downwardly extending standards 23, relatively wide, as clearly illustrated in the drawings. Each of these standards 23 is formed with a segmental vertically opening slot 24, and clip bolts 25 are secured in the respective slots and extend downwardly therefrom on opposite sides of the axle, glands 26 being secured to the respective pairs of clip bolts by nuts. By the provision of the segmental slots 24, it is obvious that the clip bolts 25 may be adjusted toward or away from each other, so as to render the fifth wheel susceptible to attachment to axles of different widths. Preferably each standard 23 is formed at its upper end with a recess 27 in registry with its slot 24, so as to provide a counter-sink for the heads of the bolts. The relatively stationary element of the fifth wheel comprises two semicircular channeled rims 28 arranged with their ends in substantial abutment and embracing the outer edge of the plate 22, whereby to form a channeled guideway for said plate. The rims 28 are formed at correspondingly opposite points respectively, with arms 29, and the said arms project inwardly in diametrical relation to the completed circle formed by the two rims, the arms overlapping each other, as shown. The lowermost arm 29 is formed with two pairs of outstanding apertured ears 30 designed to receive the clips 31 for securing the end springs 32, or the like, to the fifth wheel, and at the same time securely hold the arms together. In addition to the clips, a bolt 33 may extend through the two arms 29, to fasten them together.

In order to prevent the fifth wheel from slipping, I provide a brace 34, the lower end of which is formed into a gland to receive the clip 35 and secure such lower end to the axle, and the brace 34 projects upwardly and obliquely from the axle, its upper end passing through an apertured lug 36 projecting inwardly from the annular plate 22, being secured to said lug by jam nuts, as clearly illustrated in the drawings. By the use of this brace it is clear that the fifth wheel will be held securely against torsional movement or other strains which would tend to cause the same to tip or tilt.

In the practical application of my improved short turn running gear, it is obvious from the foregoing description, in connection with the accompanying drawings, that the reaches may be readily clipped to the front and rear axles, and that the fifth wheel elements may be as easily secured to the vehicle body or springs thereof, the standards of the annular plate 22 of the fifth wheel, and their segmental slots adapting the fifth wheel construction to axles of different widths. The semicircular channeled rim of the fifth wheel may be easily applied to the outer edge of the annular plate 22 and secured in operative relation thereto, by means of the two overlapping arms 29 with their clips, and an end spring of the vehicle body may be easily secured to the said arms 29. Obviously, upon the turning of the front axle in either direction, the rear axle will turn commensurately in the opposite direction, so as to enable the vehicle to be turned about in a circumscribed area.

Preferably, I interpose between the front ends of the reaches and the members of the coupling irons which receive them, leather washers 37, illustrated in Fig. 5 and in detail in Fig. 7, each leather washer being employed in connection with a preferably metal washer 38, for the purpose of preventing wear caused by friction on the leather washers or pads 37. Also, at the rear ends of the reaches, I employ enlongated washers 39, as illustrated in Fig. 4 and in detail in Fig. 8, these washers serving for the purpose of taking up the vibration or the rattling sound that might be caused by the jointed members at these points. It is to be understood that these various washers may or may not be used, as desired.

Having thus described the invention, what I claim is:

In a vehicle running gear of the character described, the combination with front and rear axles, of crossed reaches, pivotally connected at their front and rear ends to said axles, the connection between the rear ends of the reaches and the rear axle comprising shanks embracing said rear ends and secured thereto and formed with rounded bearing sockets, and coupling irons attached to the rear axle and formed with heads received in said sockets, said shanks being formed in the rear of their sockets with rearwardly projecting lips, as and for the purpose set forth.

In testimony whereof I affix my signature in presence of two witnesses.

MARTIN W. HEYENGA. [L. S.]

Witnesses:
OSCAR R. HILLSTROM,
GEORGE BEAUCHAMP.